(12) United States Patent
Wrase et al.

(10) Patent No.: US 6,637,832 B2
(45) Date of Patent: Oct. 28, 2003

(54) WHEEL AND CLADDING

(75) Inventors: Brian C. Wrase, Grand Rapids, MI (US); Philip O. Gerard, Ada, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 10/266,189

(22) Filed: Oct. 7, 2002

(65) Prior Publication Data

US 2003/0067212 A1 Apr. 10, 2003

Related U.S. Application Data

(60) Provisional application No. 60/328,176, filed on Oct. 10, 2001.

(51) Int. Cl.[7] ................................................ B60B 7/08
(52) U.S. Cl. ................................ 301/37.31; 301/37.11; 301/37.35
(58) Field of Search ....................... 301/37.101, 37.102, 301/37.35, 37.11, 37.42, 37.43, 108.1, 108.4, 37.31

(56) References Cited

U.S. PATENT DOCUMENTS

| 4,822,109 A | * | 4/1989 | Feria ......................... 301/37.42 |
| 5,112,112 A | * | 5/1992 | Baba ......................... 301/108.1 |
| 5,368,370 A | * | 11/1994 | Beam ........................ 301/37.36 |
| 5,564,791 A | | 10/1996 | Chase et al. |
| 5,577,809 A | | 11/1996 | Chase |
| 5,597,213 A | | 1/1997 | Chase |
| 5,630,654 A | | 5/1997 | Chase |
| 5,636,906 A | | 6/1997 | Chase |
| 5,845,973 A | | 12/1998 | Chase |
| 6,082,829 A | | 7/2000 | Chase |
| 6,152,538 A | * | 11/2000 | Ferriss et al. ............. 301/37.33 |
| 6,209,204 B1 | * | 4/2001 | Eikhoff .................... 301/37.43 |

OTHER PUBLICATIONS

2002 Saturn Layout: WL100077; Wheel Cover Design Drawing, Jul. 6, 2000.
Prior art photos of a wheel and cladding (No Date).

* cited by examiner

*Primary Examiner*—Russell D. Stormer
(74) *Attorney, Agent, or Firm*—Price, Heneveld, Cooper, DeWitt & Litton

(57) ABSTRACT

A wheel and cladding includes a cladding having an outer decorative surface and an inner surface which faces a wheel to be covered. The cladding includes a plurality of openings for receiving wheel mounting lugs. Spaced from the openings are a plurality of spaced snap-locking tabs extending from the inner facing surface of the cladding toward the wheel to which the cladding is to be mounted. The wheel includes a generally circular relief cut or other recess extending around the central hub or in spaced relationship thereto and aligned with the spaced tabs of the cladding to snap-receive the cladding for holding it in place while adhesive applied to the wheel and/or cladding is cured to permanently bond the decorative cladding to the wheel.

18 Claims, 6 Drawing Sheets

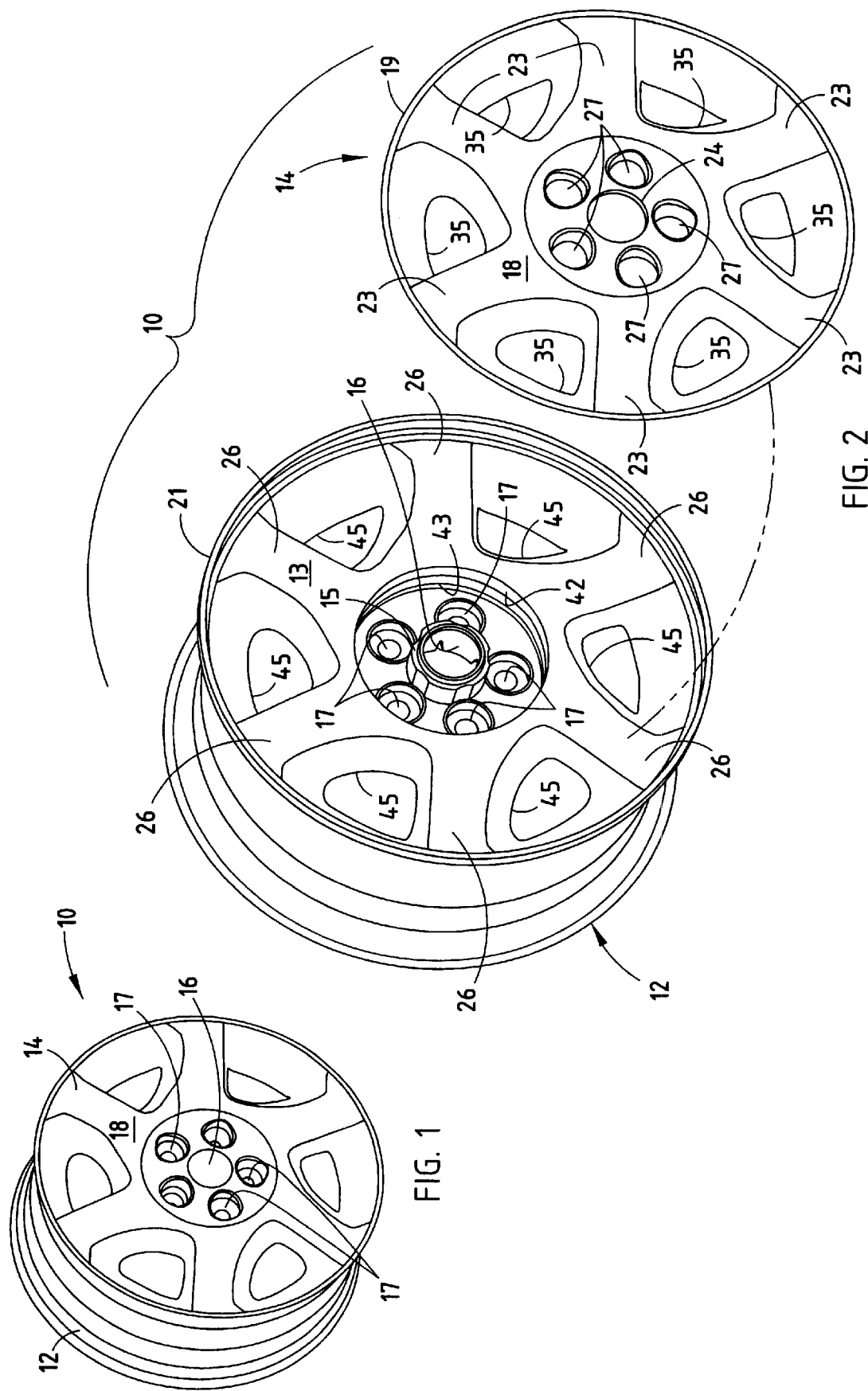

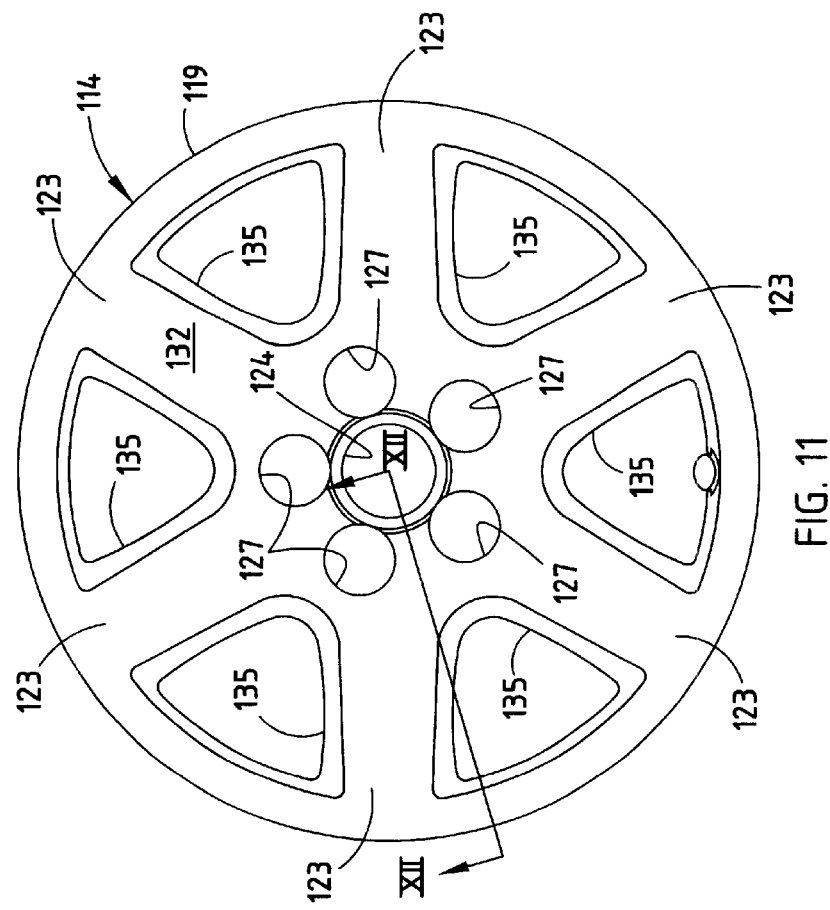
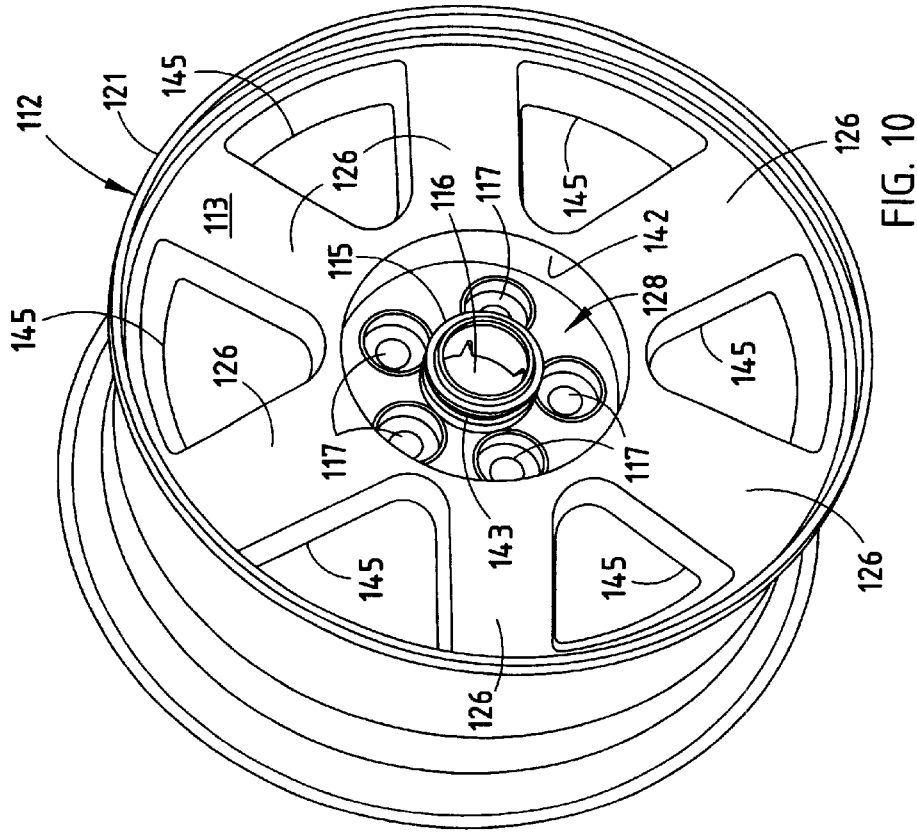
FIG. 11
FIG. 10

WHEEL AND CLADDING

CROSS-REFERENCE TO RELATED APPLICATIONS

This application claims priority under 35 U.S.C. §119(e) on U.S. Provisional Application No. 60/328,176 entitled EXPOSED LUG NUT DECORATIVE WHEEL CLADDING, filed on Oct. 10, 2001, by Brian C. Wrase, the entire disclosure of which is incorporated herein by reference.

BACKGROUND OF THE INVENTION

The present invention relates to vehicle wheels and particularly to a composite wheel including a metal wheel with a polymeric decorative cladding.

Ornamental metal-plated polymeric claddings have been employed for providing a decorative surface to the outer exposed surface of wheels for several years. U.S. Pat. Nos. 5,564,791, 5,577,809, 5,597,213, 5,630,654, 5,636,906, 5,845,973 and 6,082,829, the disclosures of which are incorporated herein by reference, represent different approaches for providing and attaching such claddings to existing wheels to provide a finished decorative appearing wheel.

Existing methods of attaching cladding to the underlying metal wheel include the use of an adhesive between the wheel and cladding in localized areas. During curing of such adhesive, the wheel cladding is temporarily held to the wheel using secondary cure caps clamping the cladding to the wheel for a period of time up to 24 hours. For such purpose, the curing cap extends through the center hub aperture of the wheel and has a plurality of outwardly projecting tabs which snap-fit around the center hub of the wheel on the inner side such that the cladding is held in place during the curing of the adhesive. The insertion and removal of the curing caps to thousands of wheels adds additional costly manufacturing steps in addition to the cost of the caps themselves and their tooling expense.

Exposed nut wheels present a further problem in that the cladding must extend into the central hub region and around the openings for the lug nuts. Until the present invention, there has been no attempted solution to the different problems presented when adhesively bonding a cladding to an exposed lug nut wheel. There exists, therefore, a need for a wheel and cladding system in which a decorative cladding can be employed in connection with exposed lug nut wheels. There also exists a need to reduce some of the wheel weight and provide for an economical method of holding the cladding on the wheel during adhesive curing without the use of a secondary cure cap or the expensive machining of undercuts into the lug wells.

SUMMARY OF THE INVENTION

The present invention solves these problems and fulfills these needs by providing a wheel and a cladding and the combination thereof. The cladding has an outer decorative surface and an inner surface which faces a wheel to be covered. The cladding includes a plurality of openings for receiving wheel mounting lugs. Spaced from the center of the hub and from said lug openings are a plurality of spaced snap-locking tabs extending from the inner facing surface of said cladding toward the wheel to which the cladding is to be mounted. In a preferred embodiment of the invention, the wheel to be clad includes a generally circular relief cut extending around the central hub in spaced relationship thereto and aligned with said spaced tabs of said cladding to snap-receive the cladding and hold it in place while a thin film adhesive applied to the wheel and/or cladding is cured to permanently bond the decorative cladding to the wheel. With such structure, the wheel itself, which can be made of magnesium, aluminum or other material, can be manufactured with a reduced amount of material in the hub area between the lugs, therefore, producing weight savings. The aperture of the central hub accommodates the service cone used in tire mounting stores during balancing and requires a smaller cap for the hub.

During manufacturing of a composite wheel and cladding, the need for a temporary cure cap is eliminated as are the concomitant handling costs and tooling for multiple configuration of cure caps. Also, it is generally unnecessary to remove rack tabs typically employed for holding the cladding during the plating process. These features result in a less expensive, lighter weight wheel while still maintaining the necessary strength requirements.

These and other features, objects and advantages of the present invention will become apparent upon reading the following description thereof together with reference to the accompanying drawings.

BRIEF DESCRIPTION OF THE DRAWINGS

FIG. 1 is a perspective view of one embodiment of a composite wheel and decorative cladding;

FIG. 2 is an enlarged exploded perspective view of the wheel and cladding shown in FIG. 1;

FIG. 10 is a front elevational view of an alternative embodiment of the invention showing a different wheel and cladding construction;

FIG. 11 is a fragmentary perspective view of the wheel of FIG. 10;

DETAILED DESCRIPTION OF THE PREFERRED EMBODIMENT

Figure 4:
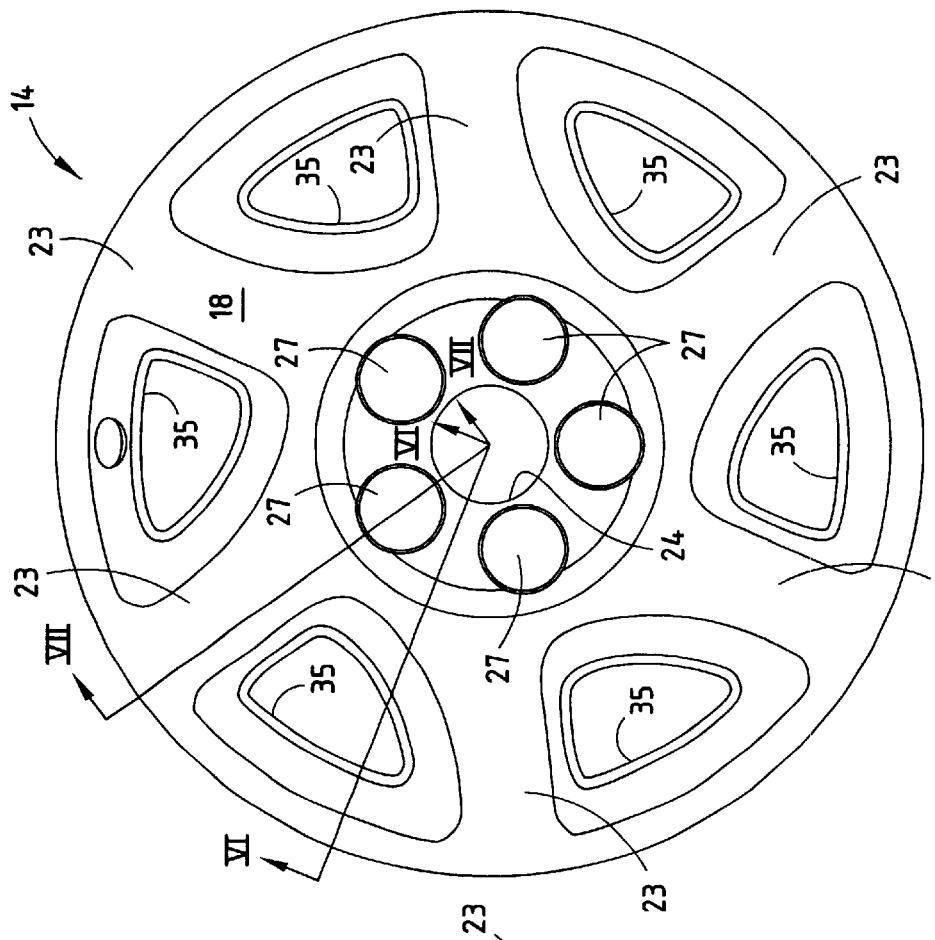
FIG. 4 is a front elevational view of the cladding shown in FIGS. 1–3.
Figure 3:
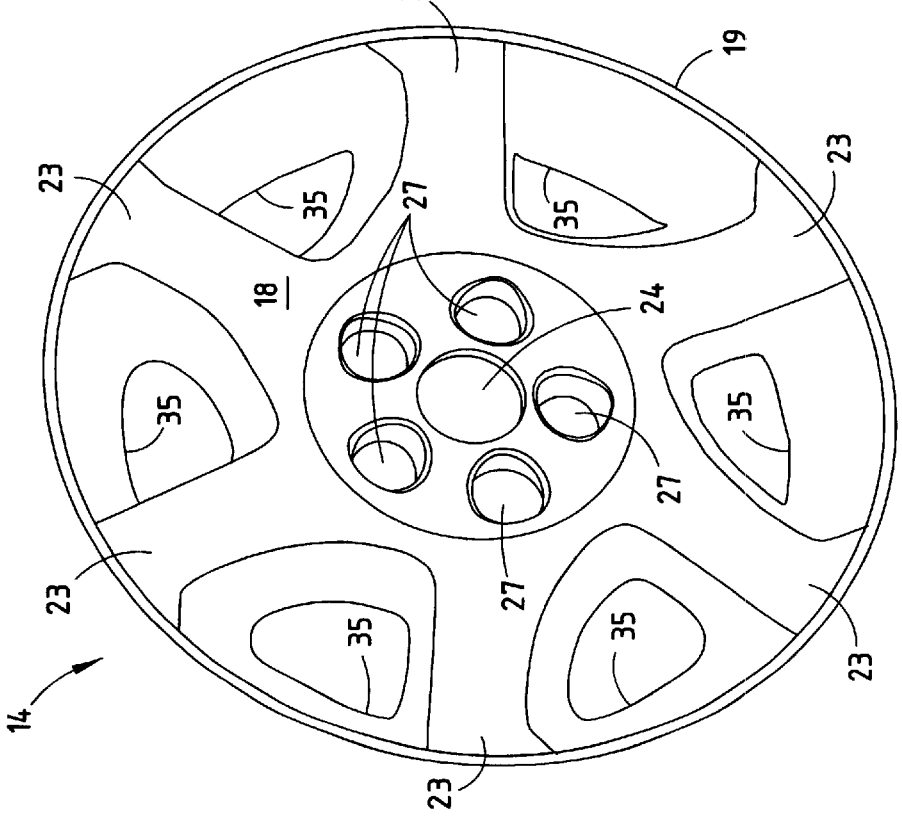
FIG. 3 is a greatly enlarged perspective view of the cladding shown in FIG. 2.

Referring initially to FIGS. 1 and 2, there is shown a composite wheel 10 comprising a wheel 12 made of aluminum, magnesium, steel, or other material conventionally used for manufacturing vehicle wheels. Composite wheel 10 is made by bonding cladding 14 to the otherwise outer exposed surface 13 (FIG. 2) of wheel 12. Cladding 14 is injection molded of a polymeric material, such as a combination of polycarbonate and ABS having an average thickness of about 2 to 4 mm. The polycarbonate to ABS ranges from about 60% to 70% polycarbonate to about 40% to 30% ABS, respectively. Other polymeric materials or composite polymeric materials may also be used. The outer decorative surface 18 of cladding 14 is covered with a shiny or satin finished metal plating, such as chrome as described in U.S. patent application Ser. No. 09/707,866 filed Nov. 7, 2000, and entitled METHOD AND COMPOSITION FOR METALLIC FINISHES, the disclosure of which is incorporated herein by reference. The outer surface 18 of cladding 14 can also be painted, textured or otherwise finished for a particular desired appearance.

Wheel 12 is of the type which has a small central opening 16 in the wheel hub 15 and a plurality of exposed lug nut apertures 17 arranged in a circular pattern and spaced for the particular vehicle on which composite wheel 10 is to be employed. Opening 16 will typically be enclosed by a relatively small cap while the lug nuts themselves (not shown) are exposed once the wheel is mounted to a vehicle.

Figure 6:
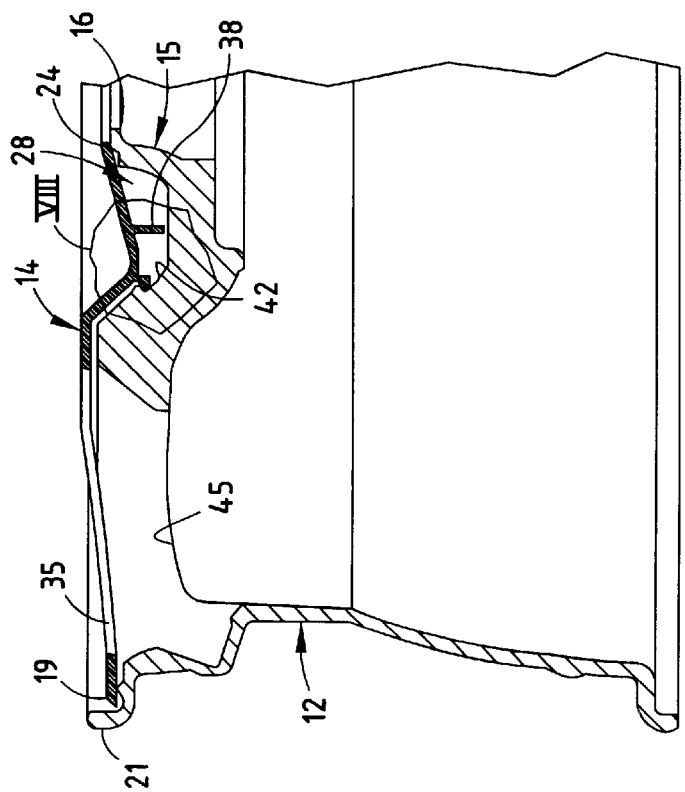
FIG. 6 is a cross-sectional view taken along section line VI—VI in FIG. 4.
Figure 9:
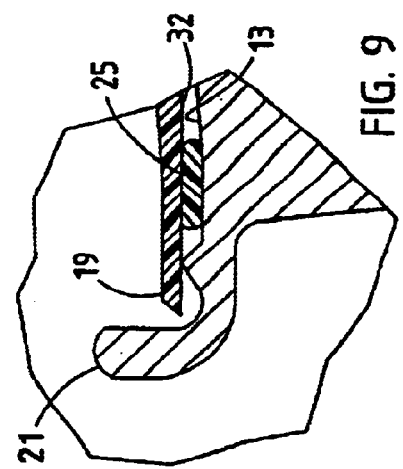
FIG. 9 is an enlarged view of the peripheral area of the composite wheel shown in area IX of FIG. 7.
Figure 7:
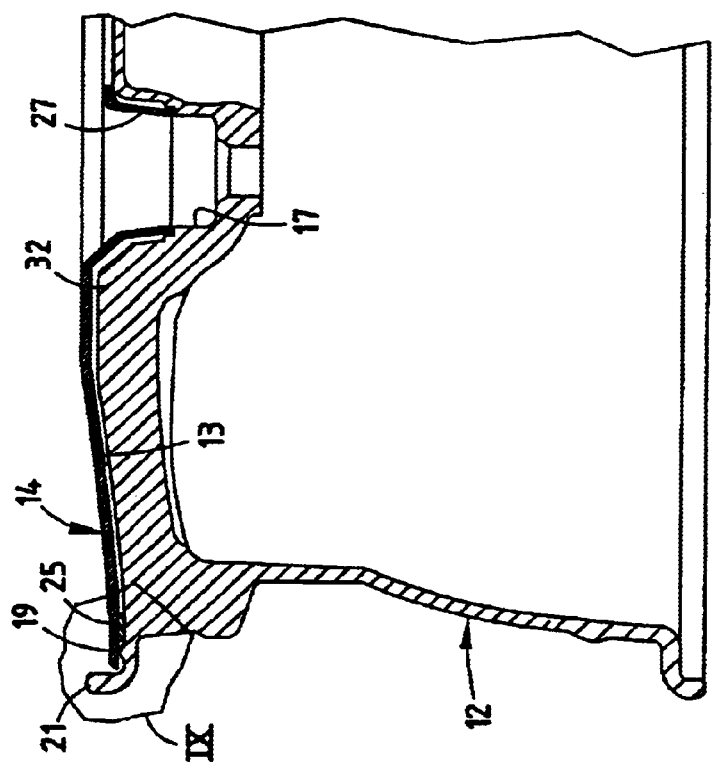
FIG. 7 is a cross-sectional view taken along section line VII—VII in FIG. 4.

Cladding 14 has a geometry which substantially conforms to that of wheel 12, namely, a rim 19 which matingly fits within rim 21 of wheel 12 (FIGS. 6, 7 and 9). Spokes 23 extend radially outwardly from the center hub opening 24 which correspond in size, shape and location to the spokes 26 on wheel 12. Between the spokes 23 of cladding 14 are openings 35 shaped to conform to corresponding openings 45 in wheel 12. The recessed central hub area surrounding central aperture 24 of cladding 14 also includes a plurality of lug nut receiving apertures 27 which align with and fit within apertures 17 in wheel 12 when assembled, as best seen in FIG. 7. The central aperture 24 is aligned with aperture 16 in wheel hub 15, as best seen in FIGS. 1 and 6. When bonded to wheel 12, therefore, cladding 14 appears as an integral outer surface of the wheel, as seen in FIG. 1.

Figure 5:
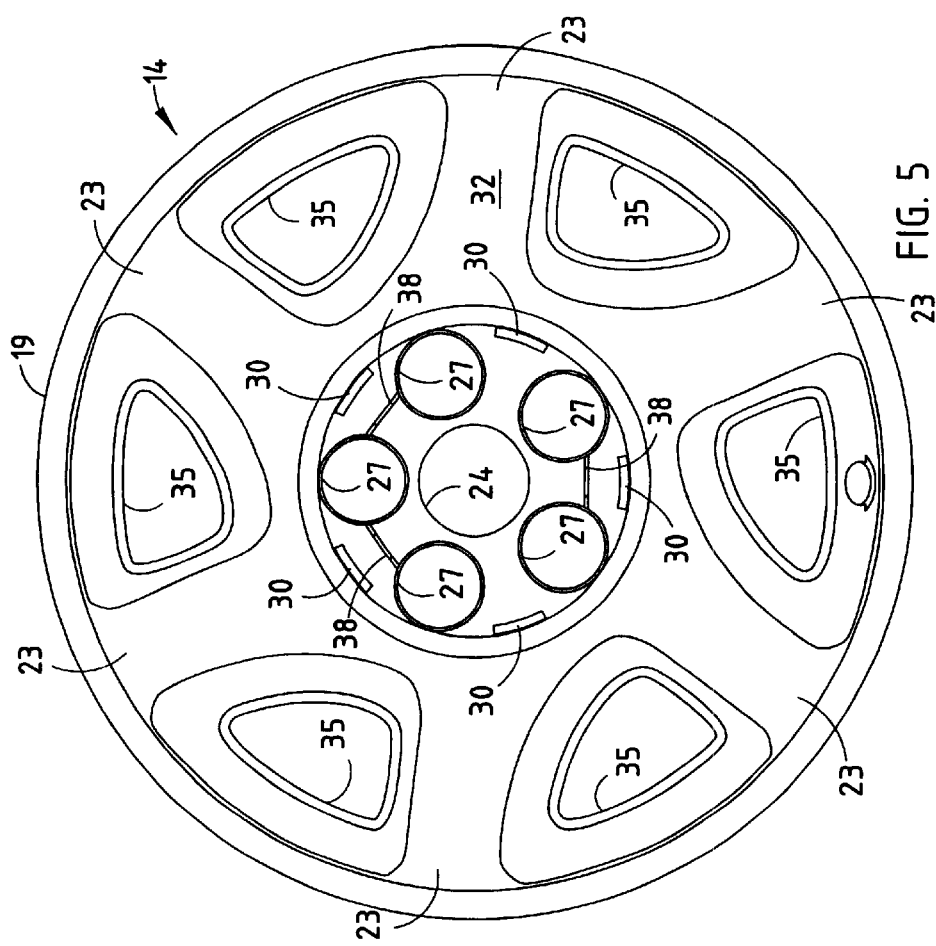
FIG. 5 is a rear elevational view of the cladding shown in FIG. 4, showing the inner surface of the cladding.
Figure 8:
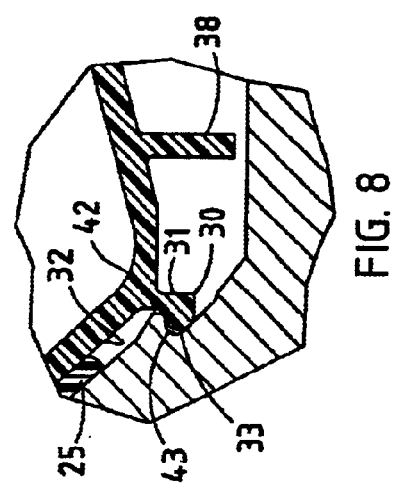
FIG. 8 is an enlarged view of one of the locking tabs and wheel undercut shown in area VIII of FIG. 6.

In order to bond the cladding 14 to wheel 12, a plurality of snap-on tabs 30 (FIGS. 5 and 8) extend outwardly from the inner facing surface 32 (FIG. 4) of cladding 14. Tabs 30 are shown in detail in the cross sectional views, including FIGS. 6 and 8, and include an arm 31 and an outwardly projecting extension 33 (FIG. 6) at equally spaced intervals, typically between lug receiving apertures 27. In the embodiment shown, five such tabs 30 are provided at approximately 72° intervals. In other wheel designs, a different number may be employed. Wheel 12 includes a circular undercut recess 43 (FIGS. 2 and 8) which is formed in wall 42 extending outwardly from the floor of annular recess 28 surrounding hub 15. Undercut recess 43, thus, is spaced radially outwardly from the center hub 16 and circle of lug-receiving apertures 17. Recess 43 lockably receives the projections 33 of tabs 30 (FIGS. 7 and 8) for snap-fitting the cladding 14 to the wheel 12. By providing the recess 28 in the area of lug nut apertures 17, material is eliminated, thereby decreasing the cost and weight of the composite wheel 10 so formed. In this design also, the rack tabs 38 (FIGS. 5, 6 and 8) employed for holding the cladding during the decorative treating of the outer surface 18 need not be cut off since the central annular recess 28 surrounding hub 15 provides clearance for the tabs. Thus, this manufacturing process is also eliminated by the wheel design of this invention.

The cladding 14 is bonded to wheel 12 by providing continuous or segmented beads of suitable bonding adhesive such as RTV (silicon adhesive) 25 (shown partially in FIGS. 8 and 9) which is placed on the inner surface 32 continuously or in sections around the rim 19 of the wheel, around each of the wheel openings 35, and in the area surrounding opening 24 where the inner surface 32 of cladding 14 and outer surface 13 of wheel 12 are in contact. Other adhesives, such as two component urethane, epoxy, or other adhesive suitable for the automotive wheel environment, may be employed. Once a bead of adhesive is applied either to the inner surface 32 of the cladding or the outer surface 13 of wheel 12, the cladding is snap-fitted by aligning the cladding to the wheel and pressing the deformable tabs 30 into recess 43, thereby snap-fitting the cladding to the wheel which, in view of the dimensions and spacing as shown particularly in FIGS. 6–9, compressibly holds the cladding to the wheel during the curing of the adhesive without requiring the cladding to be continuously press-fit against the wheel or held by a curing cap in the manufacturing process.

The resultant product is the finished composite wheel shown in FIG. 1, which has the appearance and performance of an integral wheel. In the embodiment shown in FIGS. 1–9, the undercut recess 43 is formed in the wall 42 of wheel 12 spaced radially outwardly from the circle of lug apertures 17. The recess is a continuous circle, although separate recesses aligned with tabs 30 could be employed. Also, instead of an inwardly facing recess, such as recess 43, a radially outwardly facing recess in the hub 15 of wheel 12 can be employed with inwardly facing snap-locking tabs, as described in the embodiment of FIGS. 10–13, now described.

In the alternative embodiment shown in FIGS. 10–13, the wheel and cladding in the composite wheel so formed has substantially similar elements as the first embodiment, with the exception that the snap-on tabs face radially inwardly from the cladding and engage a radially outwardly facing recess in the hub of the wheel in a position spaced radially inwardly from the circle formed by the lug nuts. Accordingly, the reference numerals employed in the alternative embodiment for these common elements are the same as in the first embodiment proceeded with the reference numeral "1" and the description accompanying the first embodiment applies to such elements.

Figure 13:
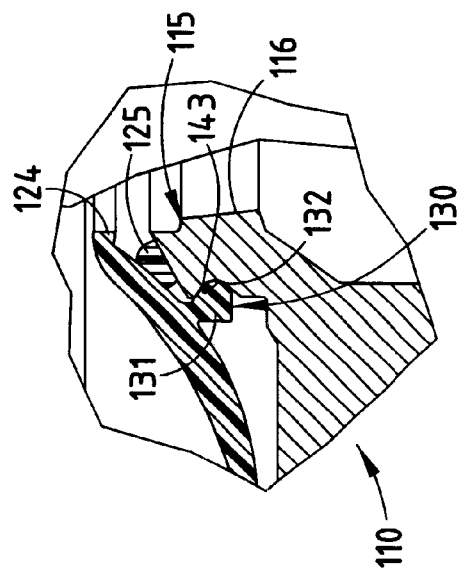
FIG. 13 is an enlarged view of the locking tab shown in area XIII of FIG. 12.
Figure 12:
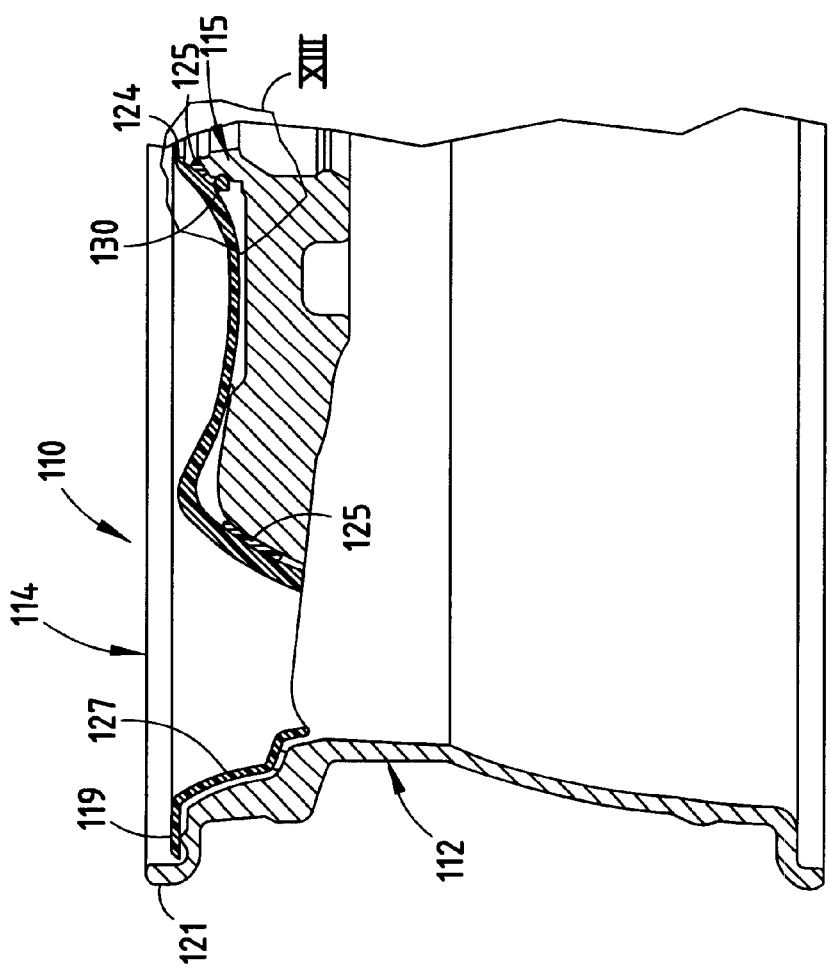
FIG. 12 is a fragmentary vertical cross-sectional view of the hub area of the composite wheel shown in FIG. 10.

In the embodiment of FIGS. 10–13, the spokes of the wheel extend radially outwardly and may be of a different size and configuration than that of the first embodiment, however, the major difference is that the wheel hub 115 (FIG. 11) includes a radially inwardly formed recess 143 (FIGS. 11 and 13) which is spaced radially inwardly from the circle formed by lug nut apertures 117, while the cladding 114 includes a plurality of circumferentially spaced inwardly projecting locking tabs 130 which project inwardly from the area surrounding opening 124 in cladding 114 between each of the lug openings 127 and include a stem 131 and radially inwardly projecting tab 132 which matingly fits within recess 143, as best seen in FIGS. 12 and 13. The tabs 130, like tabs 30, have sufficient resilience to allow cladding 114 to snap-fit onto wheel 112 to form the composite wheel 110, which includes bonding adhesives 125 at locations around the rim 119 of cladding 114, around the lug openings 127, and around the central aperture 124 of the cladding on the surface facing the wheel during assembly. Thus, as in the first embodiment, the requirement for a curing plug is eliminated, the material in the hub area 115 is reduced by recess 128, and the need to remove rack tabs is eliminated.

It will become apparent to those skilled in the art that various modifications to the preferred embodiment of the invention as described herein can be made without departing from the spirit or scope of the invention as defined by the appended claims.

The invention claimed is:

1. A composite wheel, comprising:
   a wheel having an outer surface and a plurality of exposed lug apertures formed in a circular pattern in a central hub region of the wheel, a generally circular undercut recess extending into a side of said wheel in radially inwardly spaced relationship from said lug apertures, wherein said side of said wheel faces said plurality of exposed lug apertures; and a wheel cladding including a body conforming to said outer surface of said wheel, and cladding having an exposed decorative outer surface and an inner surface facing said wheel when said cladding is attached to said wheel, said cladding including a plurality of snap-locking tabs extending from said inner surface for lockably fitting within said undercut recess of said wheel to hold said cladding to said wheel.

2. The composite wheel as defined in claim 1 and further including a bonding adhesive extending between said cladding and said wheel.

3. The composite wheel as defined in claim 2 wherein said bonding adhesive is a silicon material.

4. The composite wheel as defined in claim 2 wherein said bonding adhesive is a two-component urethane.

5. The composite wheel as defined in claim 2 wherein said binding adhesive is an epoxy.

6. A wheel cladding for use with a wheel having an outer surface and a plurality of exposed lug apertures formed in a circular pattern surrounding a central hub region of the wheel and at least one undercut recess extending into a side of the wheel facing and spaced radially inwardly from the lug apertures, said cladding comprising:

a polymeric body generally conforming to an outer surface of a wheel to be covered and including a hub and lug-receiving apertures arranged in a circular pattern surrounding said hub, said cladding having an exposed decorative outer surface and an inner surface for facing the wheel when said cladding is attached to the wheel, said cladding including a plurality of snap-locking tabs extending from said inner surface for lockably fitting within the undercut recess of a wheel to hold said cladding to a wheel wherein said tabs are spaced radially inwardly from said lug-receiving apertures.

7. The cladding as defined in claim 6, wherein said polymeric material is a blend of from about 60% to about 70% polycarbonate and from about 40% to about 30% ABS, respectively.

8. The cladding as defined in claim 6, wherein said outer surface of said cladding is plated with a metal material.

9. The cladding as defined in claim 8 wherein said metal material is chrome.

10. The cladding as defined in claim 6, wherein said outer surface of said cladding is coated.

11. The cladding as defined in claim 10 wherein said coating is decorative.

12. The cladding as defined in claim 11 wherein said coating is paint.

13. A vehicle wheel adapted to receive a decorative cladding, comprising:

a wheel having a central hub and an outer surface;

a plurality of exposed lug apertures formed in a circular pattern surrounding said central hub, wherein said outer surface defines at least one generally circular sidewall facing said circular pattern of lug apertures; and at least one undercut recess extending into said sidewall of said wheel for receiving locking tabs of a wheel cladding, wherein said undercut recess is formed in said sidewall that is speed radially inwardly from said lug apertures.

14. A composite wheel, comprising:

a metal wheel having an outer surface and a plurality of exposed lug apertures formed in a circular pattern surrounding a central hub of said wheel, said hub includes a circular sidewall facing said plurality of exposed lug apertures and having an undercut recess extending into said sidewall in radially inwardly spaced relationship from said lug apertures; and a polymeric wheel cladding including a body conforming to said outer surface of said wheel, said cladding having an exposed decorative outer surface and an inner surface facing said wheel when said cladding is attached to said wheel, said cladding including a plurality of snap-locking tabs extending from said inner surface for lockably fitting within said undercut recess of said wheel to hold said cladding to said wheel.

15. The composite wheel as defined in claim 14 wherein said decorative outer surface is coated with a decorative surface.

16. The composite wheel as defined in claim 14 and further including a bonding adhesive extending between said cladding and said wheel.

17. The composite wheel as defined in claim 14 wherein said polymeric material is a blend of from about 60% to about 70% polycarbonate and from about 40% to about 30% ABS, respectively.

18. The composite wheel as defined in claim 14 wherein said undercut recess is circular.

* * * * *

UNITED STATES PATENT AND TRADEMARK OFFICE
CERTIFICATE OF CORRECTION

PATENT NO.    : 6,637,832 B2
DATED         : October 28, 2003
INVENTOR(S)   : Wrase et al.

It is certified that error appears in the above-identified patent and that said Letters Patent is hereby corrected as shown below:

<u>Column 6,</u>
Line 17, "speed" should be -- spaced --

Signed and Sealed this

Sixteenth Day of March, 2004

JON W. DUDAS
*Acting Director of the United States Patent and Trademark Office*